US011590947B2

(12) United States Patent
Laukemann et al.

(10) Patent No.: US 11,590,947 B2
(45) Date of Patent: Feb. 28, 2023

(54) METHOD FOR CONTROLLING A HYDRODYNAMIC MACHINE AND HYDRODYNAMIC MACHINE

(71) Applicant: Voith Patent GmbH, Heidenheim (DE)

(72) Inventors: Dieter Laukemann, Frankenhardt (DE); Matthias Lehr, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 17/371,615

(22) Filed: Jul. 9, 2021

(65) Prior Publication Data
US 2021/0331656 A1 Oct. 28, 2021

Related U.S. Application Data

(63) Continuation of application No. PCT/EP2019/078311, filed on Oct. 18, 2019.

(30) Foreign Application Priority Data

Jan. 10, 2019 (DE) .................. 10 2019 100 485.3

(51) Int. Cl.
*F16H 41/04* (2006.01)
*B60T 10/02* (2006.01)
(Continued)

(52) U.S. Cl.
CPC .............. *B60T 10/02* (2013.01); *B60T 1/087* (2013.01); *F16D 57/04* (2013.01); *F16H 41/04* (2013.01);
(Continued)

(58) Field of Classification Search
CPC .......... B60T 10/02; B60T 1/087; G01F 23/14; G01F 23/18; G01F 23/185; F16D 57/04; F16H 41/30; B60K 2015/03217
See application file for complete search history.

(56) References Cited

U.S. PATENT DOCUMENTS 4,763,518 A * 8/1988 Daviaud .................. G01F 23/18
73/1.74
5,333,707 A * 8/1994 Kaneda .................... B60T 1/087
188/290
(Continued)

FOREIGN PATENT DOCUMENTS

DE 197 50 620 A1 6/1999
DE 19750620 * 6/1999 ............. G01F 23/14
DE 10 2014 207 805 A1 10/2015

OTHER PUBLICATIONS

Notification of the Transmission of the International Search Report and Written Opinion of the International Search Authority or Declaration dated Dec. 13, 2019 for International Application No. PCT/EP2019/078311 (11 pages).

*Primary Examiner* — Dustin T Nguyen
(74) *Attorney, Agent, or Firm* — Taylor IP, P.C.

(57) ABSTRACT

A method for controlling a hydrodynamic machine, including the steps of: providing a hydrodynamic machine which includes a bladed primary wheel and a bladed secondary wheel, which together form a working chamber, which can be filled with a working medium from a working medium supply contained in a working medium reservoir, to transfer drive power hydrodynamically from the bladed primary wheel to the bladed secondary wheel by forming a working medium circuit in the working chamber; applying a control pressure to the working medium supply in order to force the working medium from the working medium supply into the working chamber; detecting, at least indirectly, a pressure increase in the working medium reservoir, when the control pressure is applied to the working medium supply; and determining, as a function of the pressure increase that has been detected, a fill level of the working medium supply in the working medium reservoir.

9 Claims, 1 Drawing Sheet

(51) Int. Cl.
    *G01F 23/14*     (2006.01)
    *B60T 1/087*     (2006.01)
    *F16H 41/30*     (2006.01)
    *G01F 23/18*     (2006.01)
    *F16H 57/04*     (2010.01)
    *F16D 57/04*     (2006.01)

(52) U.S. Cl.
    CPC ......... *F16H 41/30* (2013.01); *F16H 57/0447* (2013.01); *G01F 23/14* (2013.01); *G01F 23/185* (2013.01)

(56) References Cited

U.S. PATENT DOCUMENTS

| | | | |
|---|---|---|---|
| 6,357,229 B1* | 3/2002 | Schust | F16D 33/16 |
| | | | 60/357 |
| 6,601,925 B1* | 8/2003 | Betz | B60T 1/087 |
| | | | 303/155 |
| 7,954,361 B2* | 6/2011 | Schelhas | F02M 25/0809 |
| | | | 73/49.2 |
| 9,677,634 B2* | 6/2017 | Laukemann | B60T 1/087 |
| 9,778,088 B2* | 10/2017 | Ammann | G01F 23/168 |
| 2011/0162927 A1* | 7/2011 | Huth | B60T 10/02 |
| | | | 188/290 |
| 2016/0084695 A1 | 3/2016 | Funk et al. | |
| 2016/0305294 A1 | 10/2016 | Long et al. | |
| 2017/0327099 A1* | 11/2017 | Schade | F15B 15/1485 |

* cited by examiner

METHOD FOR CONTROLLING A HYDRODYNAMIC MACHINE AND HYDRODYNAMIC MACHINE

CROSS REFERENCE TO RELATED APPLICATIONS

This is a continuation of PCT application No. PCT/EP2019/078311, entitled "METHOD FOR CONTROLLING A HYDRODYNAMIC MACHINE AND HYDRODYNAMIC MACHINE", filed Oct. 18, 2019, which is incorporated herein by reference.

BACKGROUND OF THE INVENTION

1. Field of the Invention

The present invention relates to a method for controlling a hydrodynamic machine, and, more particularly, to a hydrodynamic retarder and a hydrodynamic machine of this type.

2. Description of the Related Art

In hydrodynamic machines, the degree of filling of the working chamber with working medium can be adjusted by various methods. According to one method, a shut-off valve is provided in the inlet to the working chamber, and a control valve is provided in the outlet from the working chamber. The supply of working medium to the working chamber can be interrupted with the shut-off valve. The cross section of the flow in the working medium outlet can be varied by means of the control valve in such a manner that a greater or lesser pressure loss in the working medium outlet, and moreover the working medium volume and the working medium pressure in the working chamber are set. According to a second method, as relates to the current invention, a working medium reservoir having a working medium supply is provided, which is pressurized with a predetermined variable control pressure to displace more or less working medium out of the working medium supply into the working chamber.

In both methods, as well as in the present invention, the working medium may at the same time serve as a lubricant for the hydrodynamic machine, for example for lubrication of the bearings.

If, in the case of hydrodynamic machines of this type, which are controlled according to the second method, the working medium supply decreases in the course of the operating period of the hydrodynamic machine due to unavoidable leaks, the level of the working medium supply in the working medium reservoir may become too low. A fill level that is too low may also be a consequence of an incorrect filling during start-up or maintenance of the hydrodynamic machine. A fill level that is too low can lead to an undesirable increase in the discharge of the working medium during operation of the hydrodynamic machine and moreover to insufficient lubrication of the machine.

What is needed in the art is a method for controlling a hydrodynamic machine, and a corresponding hydrodynamic machine, where an insufficient fill level of working medium supply in the working medium reservoir is detected, as well as a low equipment related expenditure.

SUMMARY OF THE INVENTION

The present invention provides a method for controlling a hydrodynamic machine, and a corresponding hydrodynamic machine.

The hydrodynamic machine according to the invention is designed in particular in the embodiment of a hydrodynamic retarder.

The method according to the invention is utilized in a hydrodynamic machine which has a bladed primary wheel and a bladed secondary wheel, which together form a working chamber, which can be filled with working medium from a working medium supply contained in a working medium reservoir, in order to transfer drive power hydrodynamically from the primary wheel to the secondary wheel by forming a working medium circuit in the working chamber; wherein a control pressure is applied to the working medium supply in order to force the working medium from the working medium supply into the working chamber. In particular, if the hydrodynamic machine is a hydrodynamic retarder, only the bladed primary wheel rotates whereas the bladed secondary wheel remains stationary, in order to hydrodynamically brake the primary wheel. However, a retarder with a secondary wheel driven in opposite direction to the primary wheel is also considered. In a hydrodynamic machine designed as a hydrodynamic coupling or a hydrodynamic converter, as relates to the present invention according to one embodiment, the primary wheel drives the secondary wheel hydrodynamically, where applicable with the interposition of at least one guide wheel or guide vane ring positioned in the working chamber.

According to the present invention, when the control pressure is applied to the working medium supply, a pressure increase in the working medium reservoir is detected, at least indirectly, and a filling level of the working medium supply in the working medium reservoir is determined as a function of the detected pressure increase. This makes it possible to issue a warning message, in particular an audible and/or visual warning message, if a sufficient fill level of working medium supply in the working medium reservoir cannot be detected. In addition, or alternatively, it is possible to block a future activation of the hydrodynamic machine until a sufficient fill level is reestablished or detected.

According to one embodiment of the invention, a single pressure value is detected in the working medium reservoir and compared with a predetermined reference value or a predetermined reference range. According to another embodiment of the invention, a pressure curve is recorded and compared with a predetermined reference pressure curve.

The pressure value or respectively the pressure curve can be recorded with a pressure sensor provided in the working medium reservoir. In principle, however, such a pressure sensor can also be provided at another position, for example in a connecting line for working medium, which terminates on the one hand in the working medium reservoir and on the other hand at least indirectly in the working chamber. In general, indirect detection of the pressure increase in the working medium reservoir is also possible by detecting other variables and determining the pressure increase from these other variables.

A vehicle driver is informed, particularly preferably by a corresponding message if the availability of the hydrodynamic machine no longer exists. This may occur, for example via a vehicle display.

According to an especially advantageous embodiment of the invention, the pressure increase is detected, as shown, on the basis of (at least) a single or respectively discrete pressure value. For example, a pressure in the working medium reservoir is detected at least indirectly, at a predetermined period after the start of application of the control pressure or after application of a changed control pressure and is compared with a predetermined limit value. The fill level is then determined based on said comparison. In particular, it can be concluded that the fill level is too low if the detected pressure is below the specified limit value or below a limit range that includes the limit value.

Advantageously, for implementation of the method, no additional sensors that do not already exist are required. For example, the hydrodynamic machine can be activated by means of an activation command from a vehicle driver or a control device by filling the working chamber with working medium and can be deactivated by means of a corresponding deactivation command by emptying the working chamber; wherein the control pressure is applied to the working medium supply after the activation command has been detected in order to ensure a predetermined degree of filling of the working chamber. To determine the fill level of the working medium supply in the working medium reservoir, a predetermined control pressure can additionally be applied to the working medium supply in a deactivated state, in other words without detection of an activation command or when no activation command is present, in order to determine the fill level.

With one and the same pressure sensor, or with several of the same pressure sensors, the pressure in the reservoir can then be detected in the activated state of the hydrodynamic machine and used to control or regulate the fill level in the working chamber, and at the same time, when determining the fill level of the working medium supply in the working medium reservoir the pressure in the reservoir can be detected in a deactivated state of the hydrodynamic machine.

In particular, there is no float gauge in the working medium reservoir for detection of the fill level of the working medium supply.

According to one embodiment of the invention, in order to determine the limit value in the working medium reservoir, a predetermined level of the working medium supply is set, and a predetermined control pressure is applied to the working medium supply for the specified time period. After expiration of the specified time period, the pressure in the working medium reservoir is detected, at least indirectly and is specified as the limit value. Thus, a calibration occurs.

According to one embodiment of the invention, a reference pressure curve is predetermined over the time period, and a pressure curve in the working medium reservoir is detected at least indirectly over the specified time period after start of the application of the control pressure or the changed control pressure and compared with the reference pressure curve for determination of the fill level.

A hydrodynamic machine according to the invention includes a control device which is designed to carry out an inventive method, so that by means of applying the control pressure onto the working medium supply, a pressure increase in the working medium reservoir can be detected at least indirectly and, subject to the detected pressure increase a fill level of the working medium supply in the working medium reservoir can be determined.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
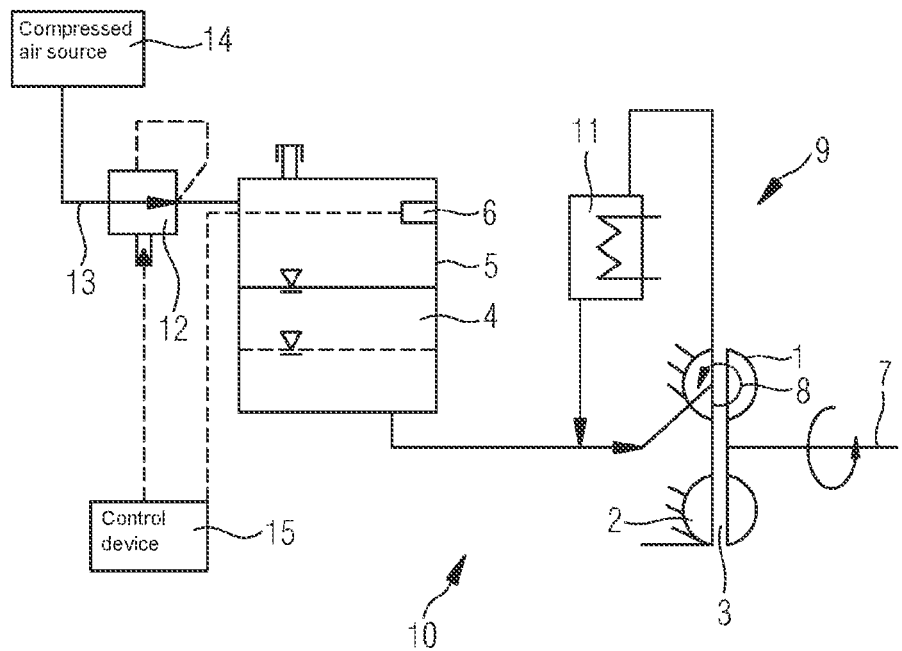
FIG. 1 is a hydrodynamic machine according to the invention.

FIG. 1 is a schematic illustration of a hydrodynamic machine in the embodiment of a hydrodynamic retarder 10. Said retarder has a bladed primary wheel 1 driven by means of a drive shaft 7 and a bladed secondary wheel 2 located opposite primary wheel 1 viewed in the axial direction, which is designed here as a stator. By means of rotationally driving primary wheel 1, a working medium circuit 8 is generated in a working chamber 3 which is formed by primary wheel 1 and secondary wheel 2, by means of which torque or drive power is transmitted from primary wheel 1 to secondary wheel 2, whereby primary wheel 1 and thus drive shaft 7 are braked. Such a hydrodynamic retarder 10 is for example a component of a motor vehicle drive train.

In general, the hydrodynamic machine—in this case hydrodynamic retarder 10—has an external working medium circuit 9, including a working medium reservoir 5 which accommodates a working medium supply 4. In the illustrated exemplary external working medium circuit 9 a radiator 11 is moreover provided. Additional units which are not illustrated here can be provided.

In order to move more or less working medium out of working medium reservoir 5 or respectively working medium supply 4 into working chamber 3, a correspondingly predetermined control pressure is applied to the working medium level of the working medium supply 4 in working medium reservoir 5. To generate the control pressure a control valve in the embodiment of a proportional valve 12 is provided which is positioned in a control air line 13 between a compressed air source 14 and the air space in working medium reservoir 5. Proportional valve 12 is actuated by a control device 15 so that it sets the desired control pressure according to the required braking torque.

Thus, hydrodynamic retarder 10 is activated in that, after detection of an activation command by a vehicle driver or a vehicle control device, transmission control device of a vehicle transmission of a motor vehicle drive train, which is not shown here in more detail and of which retarder 10 is a component, or retarder control device control device 15 actuates proportional valve 12 and as a result, working chamber 3 of hydrodynamic retarder 10, which was previously largely emptied in the deactivated state, is filled with working medium from working medium supply 4. When retarder 10 is deactivated, working chamber 3 is again emptied accordingly and the working medium is moved back into working medium supply 4. Control device 15 can be an integral part of the aforementioned vehicle control device, transmission control device or retarder control device.

To regulate the control pressure a pressure sensor 6 is provided in the air space of working medium reservoir 5 which detects the pressure in working medium reservoir 5. The detected pressure is processed for example in control unit 15.

The fill level of working medium supply 4 in working medium reservoir 5 can vary. The fill level decreases if during operation working medium in hydrodynamic retarder 10 is lost due to leaks. This can result in a lower fill level setting in working medium reservoir 5. This is illustrated by the broken line of the working medium level. In order to ensure proper functioning and proper lubrication of hydrodynamic retarder 10 a minimum fill level must be maintained in working medium reservoir 5.

In order to determine the current fill level of working medium supply 4 in working medium reservoir 5—preferably with the hydrodynamic retarder 10 deactivated (generally with the hydrodynamic machine deactivated)—a predetermined control pressure is introduced into working medium reservoir 5 by means of proportional valve 12 in conjunction with compressed air source 14, and pressure sensor 6 detects which actual pressure is established after a predetermined period of time. The recorded pressure or respectively the recorded pressure curve is compared with a limit value of the pressure, or respectively a reference pressure curve and the fill level is determined from this. This is possible because at a lower fill level, there is a larger volume of air in working medium reservoir 5, the latter being sealed in a pressure-tight manner against the environment, whereby the air volume is compressible. At a lower fill level it takes therefore comparatively longer for the pressure to build up in working medium reservoir 5. Thus the current level of working medium supply 4 in working medium reservoir 5 is also determined from the recorded pressure after expiration of a predetermined period of time or from the pressure curve.

Figure 2:
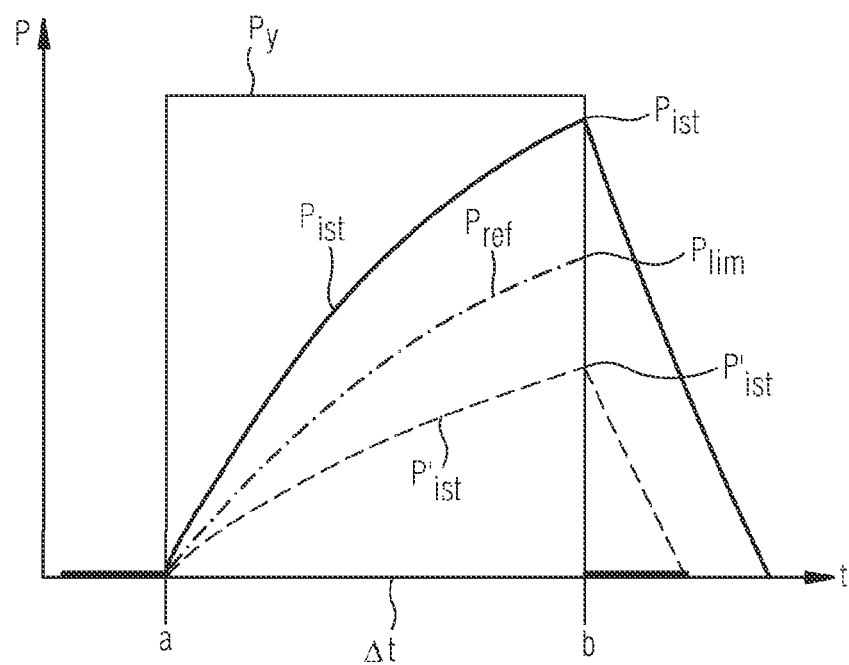
FIG. 2 is a comparison of a detected pressure value or pressure curve with a limit value or a reference pressure curve to determine the fill level therefrom.

On the one hand, the diagram of FIG. 2 illustrates control pressure pγ generated or provided by proportional valve 12 over time for a method according to the invention. At one point in time a, proportional valve 12 (see FIG. 1) opens and supplies working medium reservoir 5 with control pressure pγ. At a point in time b, proportional valve 12 closes again, so that control pressure pγ drops back to zero. The time period between the two points in time a and b is referred to as a predetermined time period Δt.

The pressure or pressure curve detected with pressure sensor 6 in working medium reservoir 5 is identified with $p_{ist}$. At a comparatively high fill level, a comparatively high recorded pressure $p_{ist}$ occurs after expiration of time period Δt or a comparatively high recorded pressure curve $p_{ist}$ occurs over time period Δt. Accordingly, at a comparatively low fill level, a comparatively low recorded pressure or pressure curve $p'_{ist}$ occurs which is shown in a dashed line. The detected pressure or pressure curve can be compared with a limit value $p_{lim}$ or reference pressure curve $p_{ref}$ which is illustrated in a dash-dot line. If the recorded pressure or pressure curve $p_{ist}$ is above limit value $p_{lim}$ or reference pressure curve $p_{ref}$, a sufficient fill level of working medium supply 4 is present in working medium reservoir 5. In contrast, if it is below (refer to termination point at end of time span Δt or respectively curve $p'_{ist}$), it means that the fill level is too low.

COMPONENT IDENTIFICATION LIST 1 primary wheel
2 secondary wheel
3 working chamber
4 working medium supply
5 working medium reservoir
6 pressure sensor
7 drive shaft
8 working medium circuit
9 external working medium circuit
10 hydrodynamic retarder
11 radiator
12 proportional valve
13 control air line
14 compressed air source
15 control device
Δt time period
a, b point in time
$p_{lim}$ limit value
$p_{ref}$ reference pressure curve
$p_{ist}$, $p'_{ist}$ detected pressure/pressure curve While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a hydrodynamic machine, comprising the steps of:
   providing a hydrodynamic machine which includes a bladed primary wheel and a bladed secondary wheel, which together form a working chamber, which is configured for being filled with a working medium from a working medium supply contained in a working medium reservoir, in order to transfer a drive power hydrodynamically from the bladed primary wheel to the bladed secondary wheel by forming a working medium circuit in the working chamber;
   applying a control pressure to the working medium supply in order to force the working medium from the working medium supply into the working chamber;
   detecting, at least indirectly, a pressure increase in the working medium reservoir, when the control pressure is applied to the working medium supply; and
   determining, as a function of the pressure increase that has been detected, a fill level of the working medium supply in the working medium reservoir, wherein a pressure is (a) detected at least indirectly in the working medium reservoir at a predetermined time period after a start of an application of one of the control pressure and a changed control pressure and (b) compared with a limit value that is predetermined.

2. The method according to claim 1, wherein a fill level is determined to be too low if the pressure that has been detected is one of below the limit value and below a limit range that includes the limit value.

3. The method according to claim 2, wherein the hydrodynamic machine is configured for being activated by way of an activation command from one of a vehicle driver and a control device by filling the working chamber with the working medium and is configured for being deactivated by way of a corresponding deactivation command by emptying the working chamber; wherein the control pressure is applied to the working medium supply after the activation command has been detected in order to ensure a predetermined fill level of the working medium in the working chamber; wherein, to additionally determine the fill level in a deactivated state without detecting an activation command of the hydrodynamic machine, a predetermined control pressure is applied to the working medium supply.

4. The method according to claim 3, wherein a pressure sensor is provided in the working medium reservoir which detects the pressure in the working medium reservoir.

5. The method according to claim 4, wherein with the pressure sensor, the pressure in the working medium reservoir can then be detected also in an activated state of the hydrodynamic machine and used to regulate the fill level in working chamber.

6. The method according claim 5, wherein in order to determine the limit value in the working medium reservoir, a predetermined level of the working medium supply is set, and a predetermined control pressure is applied to the working medium supply for the predetermined time period, after an expiration of which the pressure in the working medium reservoir is detected, at least indirectly, and is specified as the limit value.

7. The method according to claim 6, wherein a reference pressure curve is specified over the predetermined time period, and a pressure curve in the working medium reservoir (a) is detected at least indirectly over the predetermined time period after the start of the application of one of the control pressure and the changed control pressure and (b) is compared with the reference pressure curve for a determination of the fill level.

8. The method according to claim 1, wherein the hydrodynamic machine is operated as a hydrodynamic retarder.

9. A hydrodynamic machine, comprising:
a bladed primary wheel;
a bladed secondary wheel, the bladed primary wheel and the bladed secondary wheel together forming a working chamber which is configured for being filled with a working medium in order to transfer a drive power hydrodynamically from the bladed primary wheel to the bladed secondary wheel by way of a working medium circuit in the working chamber;
a working medium reservoir configured for containing a working medium supply therein to which a control pressure is applied in order to displace one of more and less of the working medium from the working medium supply into the working chamber in order to adjust a predetermined fill level; and
a control device configured for carrying out a method including the steps of:
detecting, at least indirectly, a pressure increase in the working medium reservoir, when the control pressure is applied to the working medium supply; and
determining, as a function of the pressure increase that has been detected, a fill level of the working medium supply in the working medium reservoir, wherein a pressure is (a) detected at least indirectly in the working medium reservoir at a predetermined time period after a start of an application of one of the control pressure and a changed control pressure and (b) compared with a limit value that is predetermined.

* * * * *